(12) United States Patent
Ko et al.

(10) Patent No.: US 10,135,809 B2
(45) Date of Patent: Nov. 20, 2018

(54) METHOD, SYSTEM AND APPARATUS FOR AUTHENTICATION USING APPLICATION

(71) Applicant: SK PLANET CO., LTD., Seongnam-si, Gyeonggi-do (KR)

(72) Inventors: Kyungwan Ko, Seoul (KR); Jaeyoung Ju, Gunpo-si (KR); Bongsu Um, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 164 days.

(21) Appl. No.: 14/848,255

(22) Filed: Sep. 8, 2015

(65) Prior Publication Data

US 2015/0381605 A1 Dec. 31, 2015

Related U.S. Application Data

(63) Continuation of application No. PCT/KR2013/012060, filed on Dec. 24, 2013.

(30) Foreign Application Priority Data

Mar. 8, 2013 (KR) .................. 10-2013-0025077
Mar. 21, 2013 (KR) .................. 10-2013-0030488

(51) Int. Cl.
  *H04L 29/00* (2006.01)
  *H04L 29/06* (2006.01)
  *H04L 9/32* (2006.01)
  *H04W 12/06* (2009.01)

(52) U.S. Cl.
  CPC .......... *H04L 63/083* (2013.01); *H04L 9/3247* (2013.01); *H04L 9/3268* (2013.01); *H04W 12/06* (2013.01)

(58) Field of Classification Search
  CPC .... H04L 63/083; H04L 9/3247; H04L 9/3268
  USPC .............................................. 726/9
  See application file for complete search history.

(56) References Cited

U.S. PATENT DOCUMENTS 8,195,936 B2 * 6/2012 Won .................. H04L 9/3234
                                                        713/155
2010/0077469 A1   3/2010  Furman et al.
2012/0291114 A1  11/2012  Poliashenko et al.

FOREIGN PATENT DOCUMENTS

JP    2003345751 A    12/2003
JP    2006065712 A     3/2006
KR   1020080041220 A   5/2008

OTHER PUBLICATIONS

International Search Report dated Mar. 26, 2014 for PCT/KR2013/012060.

* cited by examiner

*Primary Examiner* — Anthony D Brown
*Assistant Examiner* — Michael D Anderson
(74) *Attorney, Agent, or Firm* — Brinks Gilson & Lione

(57) ABSTRACT

The present invention relates to a method, system and apparatus for authentication using an application. Particularly, this invention can use an integrated ID by acquiring a reliable relationship between applications installed in a single terminal, or can perform the authentication of other applications by sharing authentication information through a representative application among applications. According to this invention, the account registration is performed by referring to the representative application, and thus the SSO authentication scheme may be implemented even in a mobile environment.

14 Claims, 12 Drawing Sheets

METHOD, SYSTEM AND APPARATUS FOR AUTHENTICATION USING APPLICATION

CROSS REFERENCE TO RELATED APPLICATION

This application claims the priority of Korean Patent Application No. 10-2013-0025077 filed on Mar. 8, 2013 and Korean Patent Application No. 10-2013-0030488 filed on Mar. 21, 2013 in the Korean Patent and Trademark Office. Further, this application is the PCT Continuation of International Application No. PCT/KR2013/012060 filed on Dec. 24, 2013, which is incorporated herein by reference in its entirety.

BACKGROUND OF THE INVENTION

1. Field of the Invention

The present invention relates to a method, system and apparatus for authentication using an application, more particularly, for using an integrated ID by acquiring a reliable relationship between a plurality of applications installed in a single terminal, or for performing the authentication of other applications by sharing authentication information through a representative application among the plurality of applications.

2. Description of the Related Art

With the growth of mobile communication networks and related technologies, a great variety of services based on wired/wireless communication networks are now being offered. However, since user identification (ID) systems are distributed and managed separately according to respective services, this causes several problems such as customer's inconvenience, difficulties of information security, difficulties with the observance of related regulations, the hindrance to the introduction of a new service, the obstruction to an interconnection between services, and the like. Thus, there arises a need to integrate user IDs of various services, and an integrated authentication system (tentatively named) for managing a single integrated ID is now being developed.

In the construction of this integrated authentication system, the integration of user IDs should consider flexibility capable of accepting various membership policies (qualification for membership, the range of membership, a verification method of a member, etc.) of services, stability in management, sustainability of services, scalability, and the like.

Particularly, in order to integrate authentication in many web services or applications and thereby to allow the use of such services or applications by only one authentication, an integrated authentication server is separately constructed to perform the authentication of different services or applications, or authentication information of a certain application or service is delivered to other service or authentication server through SSO (Single Sign-On) technique so that a user may not need to log in again. Related technologies may be classified into types of using cookie, session, authentication token, ticket, and the like, depending on delivery methods of authentication information. Also, depending on targets to be integrated, such technologies may be classified into a single authentication between web services, a single authentication between applications, a single authentication between a network access and a service, and the like.

However, respective individual applications installed in a single device can merely recognize their existence in the same device, and have difficulty in acquiring a reliable relationship due to incapability of connections therebetween.

Meanwhile, for use of contents in a normal application, authentication may require only the access to an internet site that provides such an application. However, a certain site often requires a new member registration procedure to create a unique ID for the execution of an application and, only in case of access using that ID, allows the use of contents offered by the application.

Therefore, a user who desires to use contents in many internet sites providing different applications should create and remember respective individual IDs and passwords for a great number of applications. Additionally, a user is required to repeatedly enter similar personal information whenever he or she desires to become a new member for certain sites. Further, in case there is a need to change personal information, a user has to join many sites or applications one by one so as to change personal information.

BRIEF SUMMARY OF THE INVENTION

In order to solve the above problems, the present invention is to provide a method, system and apparatus for authentication using an application, being capable of acquiring a reliable relationship between a plurality of applications installed in a single terminal by using a reliability token and also capable of using an integrated ID based on the reliable relationship because respective individual applications installed in a single device can merely recognize their existence in the same device and have difficulty in acquiring the reliable relationship due to incapability of connections therebetween.

Additionally, in order to solve the above-discussed problems of having to access each internet site offering each application for the authentication of applications and, in case of using contents, having to creating a unique ID and password for each individual application, the present invention is to provide a method, system and apparatus for authentication using an application, being capable of sharing authentication information using a representative application among a plurality of applications installed in a single terminal and thereby performing the authentication of other applications.

An integrated authentication apparatus according to an embodiment of the present invention for accomplishing the above purpose comprises a service communication unit connected with at least one terminal and a service providing apparatus and configured to transmit or receive data for acquiring a reliable relationship between a plurality of applications; a reliability token creation unit configured to receive a signal of requesting confirmation of reliability between a first application and a second application from the terminal, to create a reliability token for acquiring a reliable relationship between the first and second applications, and to transmit the created reliability token to the terminal; and a reliability token confirmation unit configured to confirm the reliability token when a signal of requesting confirmation of the reliability token is received from the service providing apparatus, and to transmit a confirmation result to the service providing apparatus.

Additionally, in the integrated authentication apparatus according to this invention, further comprises are a user authentication unit configured to create a token for user authentication in response to a login request including service identification information from a representative application installed in the at least one terminal, or to perform user authentication by confirming the token for user authentication when the token is received; and a reliability authentication unit configured to create a token for confirming reliability of a service application corresponding to the service identification information, based on information authenticated through the user authentication unit, to offer the created token to the terminal, to verify the token offered from the service providing apparatus when a token confirmation is requested from the service providing apparatus for offering a service corresponding to the service identification information, and to offer a verification result of the token to the service providing apparatus.

Additionally, in the integrated authentication apparatus according to this invention, the reliability token creation unit is further configured to create a single-use token for acquiring the reliable relationship between the first and second applications.

Additionally, in the integrated authentication apparatus according to this invention, the reliability token confirmation unit is further configured to confirm the reliability token received from the service providing apparatus and to discard the confirmed reliability token.

Additionally, in the integrated authentication apparatus according to this invention, further comprised is an integrated ID management unit configured to integrate and manage IDs of a plurality of applications.

Additionally, in the integrated authentication apparatus according to this invention, the user authentication unit is further configured to store an integrated ID of each user and an authentication token created for each user.

Additionally, in the integrated authentication apparatus according to this invention, the reliability authentication unit is further configured to store the reliability token for confirming reliability of the service application, and to delete the reliability token verified once.

A terminal according to an embodiment of this invention comprises a communication unit configured to transmit or receive data for acquiring a reliable relationship between a plurality of applications by communicating with an integrated authentication apparatus and a service providing apparatus; and a control unit configured to detect an event for requesting acquisition of a reliable relationship between a first application and a second application, to request the integrated authentication apparatus to confirm reliability between the first and second applications, to request the service providing apparatus to confirm a reliability token for driving the second application when the reliability token is received from the integrated authentication apparatus, to drive the second application offered through the service providing apparatus depending on a confirmation result of the reliability token, and to establish a reliable relationship between the first and second applications.

Additionally, in the terminal according to this invention, further comprised is a memory unit configured to store a representative application for integrated authentication and at least one service application.

Additionally, in the terminal according to this invention, the control unit is further configured to execute the representative application in response to a login request from a specific service application, to request authentication by transmitting user authentication information and service identification information corresponding to the specific service application to the integrated authentication apparatus through the representative application, to receive an authentication token and a reliability token from the integrated authentication apparatus in response to the request, and to transmit, at the specific service application, the reliability token to the service providing apparatus so that the service providing apparatus confirms authentication by using the reliability token.

Additionally, in the terminal according to this invention, the representative application is one of the plurality of service applications.

Additionally, in the terminal according to this invention, the control unit is further configured to request verification of authentication by transmitting the received authentication token and the service identification information of the specific service application to the integrated authentication apparatus when the representative application is in a login state, and to receive an authentication result and the reliability token from the integrated authentication apparatus.

An authentication method using an application according to an embodiment of this invention comprises steps of, at a terminal, detecting an event for requesting acquisition of a reliable relationship between a first application and a second application; at the terminal, requesting an integrated authentication apparatus to confirm reliability between the first and second applications; at the terminal, requesting a service providing apparatus to confirm a reliability token for driving the second application when the reliability token is received from the integrated authentication apparatus; at the terminal, driving the second application offered through the service providing apparatus depending on a confirmation result of the reliability token; and at the terminal, establishing a reliable relationship between the first and second applications.

Additionally, in the authentication method according to this invention, the reliability token is a single-use token which is issued for acquiring the reliable relationship between the first and second applications at the integrated authentication apparatus, and which is discarded after token confirmation performed at the integrated authentication apparatus in response to a request of the service providing apparatus.

Additionally, in the authentication method according to this invention, the detecting step includes steps of, at the terminal, detecting occurrence of an event associated with acquisition of reliability with the first application from the second application; and at the terminal, requesting the first application to acquire a reliable relationship with the second application in response to the event occurrence.

Additionally, in the authentication method according to this invention, the establishing step includes establishing a reliable relationship with the second application in a mobile environment through the first application which is a representative application, and applying at least one authentication technique for authentication of the second application.

An authentication method using an application according to an embodiment of this invention comprises steps of, at an integrated authentication apparatus, receiving a signal of requesting confirmation of reliability between a first application and a second application according to a request of at least one terminal; at the integrated authentication apparatus, creating a reliability token for acquiring a reliable relationship between the first and second applications; at the integrated authentication apparatus, transmitting the created reliability token to the terminal; at the integrated authentication apparatus, receiving a signal of requesting confirmation of the reliability token from a service providing apparatus; at the integrated authentication apparatus, confirming the received reliability token; and at the integrated authentication apparatus, transmitting a confirmation result to the service providing apparatus.

Additionally, in the authentication method according to this invention, the creating step includes, at the integrated authentication apparatus, creating a single-use token for acquiring the reliable relationship between the first and second applications Additionally, in the authentication method according to this invention, the confirming step includes steps of, at the integrated authentication apparatus, confirming the reliability token received from the service providing apparatus; and at the integrated authentication apparatus, discarding the confirmed reliability token.

An authentication method using an application in a terminal according to an embodiment of this invention comprises steps of, detecting a login event of a specific service application; at a representative application, requesting a login by transmitting service identification information of the specific service application to an integrated authentication apparatus when the login event is detected; at the representative application, receiving login result information including a reliability token created corresponding to the service identification information from the integrated authentication apparatus in response to the request; at the representative application, offering the reliability token to the specific service application; at the specific service application, requesting a reliability confirmation by offering the reliability token to the service providing apparatus; and executing the specific service application depending on a result of the reliability confirmation.

Additionally, in the authentication method according to this invention, the step of requesting the login includes steps of confirming whether the representative application is logged in; if the representative application is not logged in, receiving an input of a user ID and password for the login of the representative application; and requesting the login by transmitting the input of a user ID and password to the integrated authentication apparatus together with service identification information of the specific service application.

Additionally, in the authentication method according to this invention, the login result information further includes an authentication token created according to authentication of the user ID and password.

Additionally, in the authentication method according to this invention, the step of requesting the login further includes step of, if the representative application is logged in, requesting the login by transmitting an authentication token received earlier by the representative application to the integrated authentication apparatus together with the service identification information.

An authentication method using an application according to an embodiment of this invention comprises steps of, at an integrated authentication apparatus, performing user authentication in response to a login request including service identification information from a representative application installed in at least one terminal; at the integrated authentication apparatus, creating a reliability token for confirming reliability of a service application corresponding to the service identification information based on the authenticated information; at the integrated authentication apparatus, transmitting a login result including the reliability token to the terminal; at the integrated authentication apparatus, verifying the reliability token offered from a service providing apparatus when confirmation of the reliability token is requested from the service providing apparatus for offering a service corresponding to the service identification information; and at the integrated authentication apparatus, offering a verification result of the reliability token to the service providing apparatus.

Additionally, in the authentication method according to this invention, further comprised is step of, before the performing step, at the integrated authentication apparatus, if the representative application is logged in, receiving from the terminal an authentication token received earlier by the representative application together with the service identification information.

Additionally, in the authentication method according to this invention, further comprised is step of, before the performing step, if the representative application is not logged in, receiving a user ID and password for login of the representative application from the terminal, together with the service identification information of the service application.

According to this invention, the account registration is performed by referring to a representative application, and thus the SSO (Single Sign On) authentication scheme may be implemented even in a mobile environment.

Additionally, this invention may be implemented only by means of reference between applications through a representative application without using an internal browser and without restriction of operating systems.

Also, the use of the SSO authentication scheme can enhance the transparency and reliability of management, reduce cost, and improve efficiency. Namely, it is possible to effectively manage a user ID or password, to use another system without any additional login, to support authentication, to decrease the frequency of query about a password from a manager, to reduce a need for a user's re-input for login/end/re-access, or to report a log of user access.

And also, authentication information can be shared in a single device through a representative application on the assumption that a reliable relationship is established between applications.

DETAILED DESCRIPTION OF THE PREFERRED EMBODIMENTS

Figure 1:
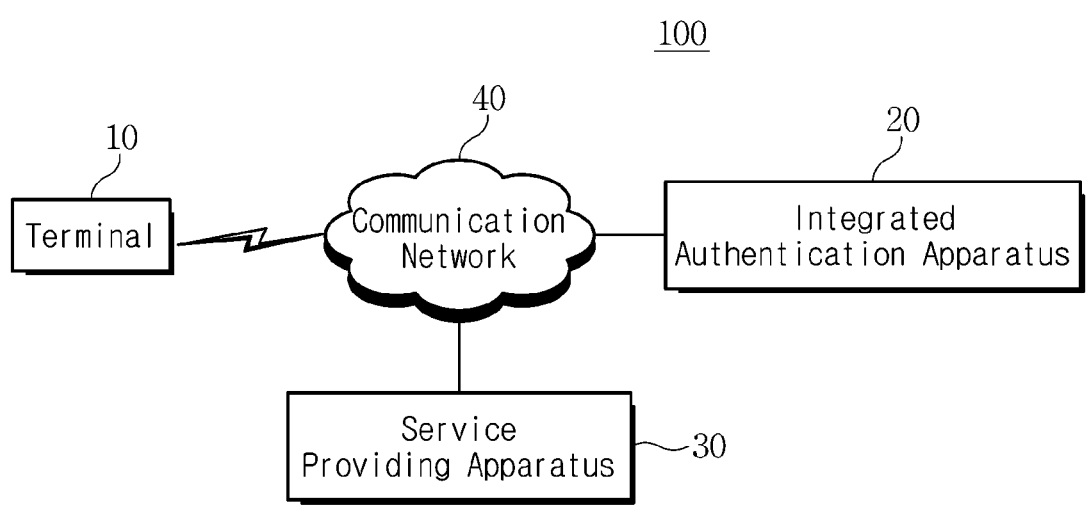
FIG. 1 is a diagram illustrating the configuration of an authentication system using an application in accordance with an embodiment of the present invention.

Hereinafter, preferred embodiments of the present invention will be described with reference to the accompanying drawings. However, well known functions or structures may not be described or illustrated in detail to avoid obscuring the subject matter of the present invention. Through the drawings, the same or similar reference numerals denote corresponding features consistently.

The terms and words used in the following description and claims are not limited to the bibliographical meanings, but, are merely used by the inventor to enable a clear and consistent understanding of the present invention. Accordingly, it should be apparent to those skilled in the art that the following description of various embodiments of the present invention is provided for illustration purpose only and not for the purpose of limiting the present invention as defined by the appended claims and their equivalents.

Hereinafter, a terminal according to embodiments of this invention will be described as a mobile communication device capable of executing various types of applications in a state of connection with a communication network, executing an application by using an integrated ID, transmitting or receiving data for acquiring a reliable relationship between applications, executing an application by using the integrated ID in a state of connection with the communication network, and/or transmitting or receiving data for performing the authentication of a service application by using a representative application. The mobile communication device is, however, exemplary only and a great variety of devices such as all kinds of information communication devices, multimedia devices, wired/wireless devices, stationary devices, and internet protocol (IP) devices may be used as the terminal for this invention. Particularly, this invention may be applied to an operating system (OS) incapable of data check between applications and including a mobile OS such as iOS, Android, Symbian, Bada, or the like, adapted for a mobile environment. Also, mobile devices having various mobile communication specifications such as a cellular phone, a portable multimedia player (PMP), a mobile internet device (MID), a smart phone, a desktop, a table PC, a notebook, a netbook, a server, or any other information communication device may be favorably utilized.

Meanwhile, in embodiments of this invention, a representative application will be often referred to as the first application, and a service application will be often referred to as the second application. The above expressions are, however, used merely for the purpose of clarity, and any other expression may be used alternatively. In this disclosure, the representative application is an application logged in with an integrated ID and may be used for acquiring a reliable relationship with the service application that needs a login with the integrated ID. A reliability token offered from an integrated ID management apparatus that takes charge of the integrated ID and authentication for acquiring a reliable relationship between applications may be applied to the representative application.

Hereinafter, an authentication system using an application according to an embodiment of this invention will be described. In particular, based on the assumption that a reliable relationship has been already established between a representative application and an integrated authentication apparatus, a system for acquiring a reliable relationship between applications will be described. Here, the integrated authentication apparatus may have already stored login information (ID, password, etc.) about the representative application, user information, and the like.

Additionally, although an application according to an embodiment of this invention will be described using a mobile application as an exemplary example, the application is not limited to the mobile application. An applet which is a Java communication program inserted in an internet webpage source may also be such an application.

Further, although a login method for the authentication of an application will be described using an ID and a password as exemplary examples, the login method is not limited to that. A public certification method or a login method using I-PIN or the like may also be used.

FIG. 1 is a diagram illustrating the configuration of an authentication system using an application in accordance with an embodiment of the present invention.

Referring to FIG. 1, the authentication system 100 using an application in accordance with this invention is configured to include a terminal 10, an integrated authentication apparatus 20, a service providing apparatus 30, and a communication network 40.

The communication network 40 performs the transmission of data and the exchange of information between the terminal 10 and the integrated authentication apparatus 20. Particularly, the communication network 40 may use various types of networks based on, for example, a wireless communication scheme such as WLAN (Wireless LAN), Wi-Fi, Wibro, Wimax, or HSDPA (High Speed Downlink Packet Access), and a wired communication scheme such as Ethernet, xDSL (ADSL, VDSL), HFC (Hybrid Fiber Coax), FTTC (Fiber To The Curb), or FTTH (Fiber To The Home). Meanwhile, the communication network 40 may be limited to the above schemes, and any other well-known or possible communication scheme may be employed.

The terminal 10 is connected with the integrated authentication apparatus 20 through the communication network 40 and then transmits or receives all data for acquiring a reliable relationship between applications. Particularly, the terminal 10 detects an event for requesting the acquisition of a reliable relationship between a representative application and a service application, and then requests the integrated authentication apparatus 20 to confirm the reliability between the representative application and the service application.

If a reliability token is received from the integrated authentication apparatus 20, the terminal 10 requests the service providing apparatus 30 to confirm the reliability token for driving the service application. Then, depending on the result of confirming the reliability token, the terminal 10 drives the service application offered through the service providing apparatus 30, and also establishes a reliable relationship between the representative application and the service application.

Additionally, the terminal 10 according to another embodiment of this invention is connected with the integrated authentication apparatus 20 through the communication network 40 and then transmits or receives all data for performing application authentication using an integrated ID. Particularly, the terminal 10 executes the representative application in response to a login request from a specific service application, and requests authentication by transmitting user authentication information and service identification information corresponding to the specific service application to the integrated authentication apparatus 20 through the representative application.

The terminal 10 receives an authentication token and a reliability token from the integrated authentication apparatus 20 in response to a request, and transmits the reliability token of a specific service application to the service providing apparatus 30 so that the service providing apparatus 30 can confirm authentication by using the reliability token.

From the terminal 10, the integrated authentication apparatus 20 receives a signal of requesting the confirmation of reliability between the representative application and the service application. Then the integrated authentication apparatus 20 creates a reliability token for acquiring a reliable relationship between the representative application and the service application and transmits the created reliability token to the terminal 10.

Thereafter, when a signal of requesting the confirmation of the reliability token is received from the service providing apparatus, the integrated authentication apparatus 20 confirms the reliability token and then transmits a confirmation result to the service providing apparatus 30.

According to this invention, the SSO authentication scheme may be applied even to a mobile environment in which the account registration of the service application is performed by referring to the representative application. Here, there are three types of the SSO (Single Sign-On) authentication scheme, i.e., a basic authentication scheme, an ID federation authentication scheme, and an assertion authentication scheme.

First, the basic authentication scheme is widely used in case of constructing a new system or integrating user information. Therefore, integrated authentication information and an integrated login page are contained in a central authentication server. Second, the ID federation authentication scheme is used in case of continuing to use existing user information when there are authentication information management servers for respective individual service providers. Therefore, a central authentication server has no integrated authentication information, but has authentication information for indicating login or not so as to perform a central management of login. Third, the assertion authentication scheme is suitable for case of using both existing authentication information and integrated authentication information. A service provider has a login page and performs forced login processing to a central authentication server after login processing. In this case, since two types of authentication information coexist, a synchronization process for authentication information is needed.

Additionally, the integrated authentication apparatus 20 according to another embodiment of this invention performs the confirmation of reliability between the representative application and the service application in response to a request of the terminal 10 and transmits or receives data for the application authentication using an integrated ID. Particularly, the integrated authentication apparatus 20 creates an authentication token for user authentication in response to a login request including service identification information from the representative application installed in the terminal 10. Also, when the authentication token for user authentication is received, the integrated authentication apparatus 20 performs the user authentication by confirming the authentication token, creates a reliability token for the reliability confirmation of the service application corresponding to the service identification information on the basis of the authenticated information, and offers the created reliability token to the terminal 10.

If a token confirmation is requested from the service providing apparatus 30 that offers a service corresponding to the service identification information, the integrated authentication apparatus 20 verifies the reliability token offered from the service providing apparatus 30 and offers a verification result for the reliability token to the service providing apparatus 30.

Meanwhile, a processor installed in the terminal 10 or the integrated authentication apparatus 20 according to this invention may process a program command for implementing a method according to this invention. This processor may be a single-threaded processor in an embodiment, and be a multi-threaded processor in another embodiment. Furthermore, this processor can also process a command stored in a memory or storage.

Figure 2:
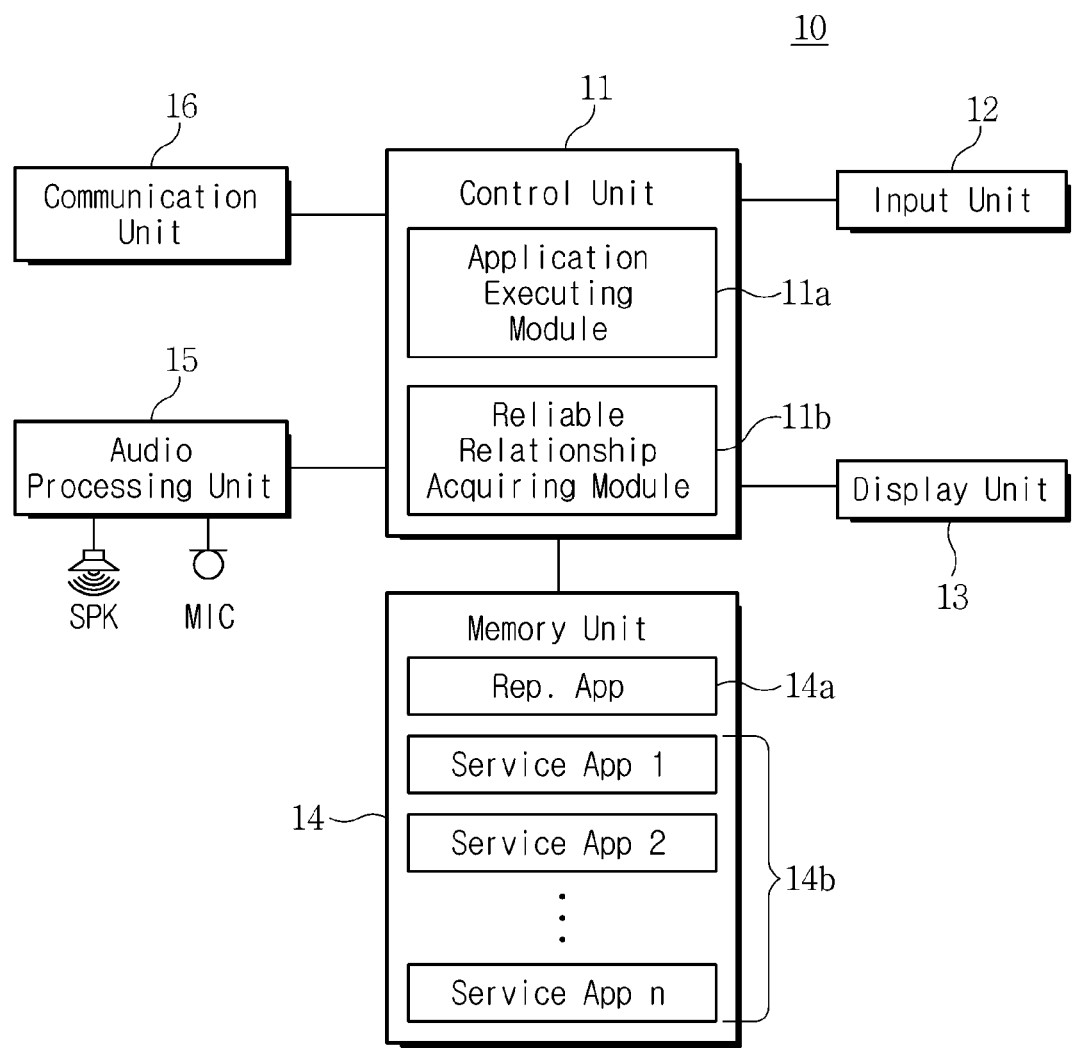
FIG. 2 is a block diagram illustrating the configuration of a terminal in accordance with the present invention.

FIG. 2 is a block diagram illustrating the configuration of a terminal in accordance with the present invention.

Referring to FIG. 2, the terminal 10 according to the present invention includes a control unit 11, an input unit 12, a display unit 13, a memory unit 14, and a communication unit 15. Here, the control unit 11 includes an application executing module 11a and a reliable relationship acquiring module 11b, and the memory unit 14 includes a representative application 14a and a plurality of service applications 14b.

The input unit 12 receives various types of information based on numbers, letters, or the like, and delivers an input signal for setting or controlling various functions of the terminal 10 to the control unit 11. Additionally, the input unit 12 may be configured to include at least one of a keypad and a touchpad each of which creates an input signal in response to a user's touch or manipulation. Further, the input unit 12 may be realized in the form of a single touch panel (or a touch screen) together with the display unit 13 and thus simultaneously perform input and display functions. Also, the input unit 12 may use various input devices such as a keyboard, a keypad, a mouse, a joystick, and any other input manner.

The display unit 13 displays thereon information about operating states and results while a function of the terminal 10 is performed. Additionally, the display unit 13 may display a menu of the terminal 10 and user data entered by a user. Here, the display unit 13 may be formed of LCD (Liquid Crystal Display), TFT-LCD (Thin Film Transistor LCD), LED (Light Emitting Diode), OLED (Organic Light Emitted Diode), AMOLED (Active Matrix OLED), a retina display, a flexible display, a three dimensional display, or the like. In case of being formed as a touch screen, the display unit 13 may perform a part or all of functions of the input unit 12.

The memory unit 14, which is a device for storing data therein, includes a main memory and an auxiliary memory, and stores a program required for the operation of the terminal 10. The memory unit 14 may include a program region and a data region. When a user's request for activating a certain function is received, the terminal 10 offers the requested function under the control of the control unit 11 by invoking a corresponding program from the memory unit 14. Particularly, the memory unit 14 according to this invention stores therein an operating system (OS) for booting the terminal 10, a program for executing an application, a program for acquiring a reliable relationship between applications, a program for performing an application authentication by using an integrated ID, and the like.

Additionally, the memory unit 14 stores therein various kinds of applications, which may be classified into the representative application 14*a* and a plurality of service applications 14*b*.

The communication unit 15 performs a function to transmit or receive data to or from the integrated authentication apparatus 20 and the service providing apparatus 30 through the communication network 40. Here, the communication unit 15 includes a radio frequency (RF) transmitter that up-converts the frequency of outgoing signals and amplifies such signals, an RF receiver that amplifies with low-noise incoming signals and down-converts the frequency of such signals, and the like. The communication unit 15 may include at least one of a wireless communication module (not shown) and a wired communication module (not shown). The wireless communication module is configured to transmit or receive data, based on wireless communication schemes, and may transmit or receive data to or from the integrated authentication apparatus 20 by using one of a wireless network communication module, a WLAN communication module, and a WPAN communication module when the terminal 10 uses a wireless communication. The wired communication module is configured to transmit or receive data in a wired manner, and may transmit or receive data to or from the integrated authentication apparatus 20 by accessing the communication network 40 in a wired manner. Namely, the terminal 10 can access the communication network 40 by using such a wireless or wired communication module and then transmit or receive data to or from the integrated authentication apparatus 20 through the communication network 40. Particularly, the communication unit 15 according to this invention transmits or receives data for acquiring a reliable relationship between applications by communicating with the integrated authentication apparatus 20 and the service providing apparatus 30. Also, the communication unit 30 transmits or receives data associated with integrated authentication using the representative application by applying an integrated ID through a communication with the integrated authentication apparatus 20 and the service providing apparatus 30.

The control unit 11 may be a processing unit configured to drive the OS and respective elements. Particularly, the control unit 11 according to this invention detects an event for requesting the acquisition of a reliable relationship between the representative application and the service application. Namely, the control unit 11 detects the occurrence of an event associated with the acquisition of reliability with the representative application from the service application, and then requests the representative application to acquire a reliable relationship with the service application.

If an event occurs, the control unit 11 requests the integrated authentication apparatus 20 to confirm reliability between the representative application and the service application. Also, if a reliability token is received from the integrated authentication apparatus 20, the control unit 11 requests the service providing apparatus 30 to confirm the reliability token for driving the service application. Here, the reliability token is a single-use token created by the integrated authentication apparatus 20 for acquiring a reliable relationship between the representative application and the service application, and is discarded after a token confirmation performed at the integrated authentication apparatus 20 in response to a request of the service providing apparatus 30.

Depending on confirmation results of the reliability token, the control unit 11 drives the service application offered through the service providing apparatus 30 and establishes a reliable relationship between the representative application and the service application. At this time, the control unit 11 may establish a reliable relationship with the service application in a mobile environment through the representative application and apply authentication technique for the authentication of the service application.

In addition, the control unit 11 according to another embodiment detects a login event of a specific service application. Then the control unit 11 detects that the representative application requests a login by transmitting service identification information of the specific service application to the integrated authentication apparatus 20. At this time, the control unit 11 determines whether the representative application is logged in. If the representative application is not logged in, the control unit 11 receives a user ID and password inputted for the login of the representative application. Then the control unit 11 transmits the received user ID and password, together with service identification information of the specific service application, to the integrated authentication apparatus 20 and requests a login.

Meanwhile, if the representative application is logged in, the control unit 11 transmits an authentication token received earlier by the representative application, together with service identification information, to the integrated authentication apparatus 20 and requests a login. Here, the authentication token is created again only at the time of login of the terminal 10 and stores therein a login result value The control unit 11 receives, from the integrated authentication apparatus 20, information about a login result of the representative application including the reliability token created corresponding to the service identification information. Here, the login result information includes the authentication token created according to the authentication of a user ID and password. Also, the reliability token is a single-use token created by the integrated authentication apparatus 20 for confirming a reliable relationship between the representative application and the service application and discarded after a token confirmation performed by the integrated authentication apparatus 20 in response to a request of the service providing apparatus.

The control unit 11 detects a signal of offering the reliability token to a specific service application at the representative application. Namely, the specific service application offers the reliability token to the service providing apparatus 30 and requests the confirmation of reliability. Then, depending on a confirmation result of reliability, the specific application is executed.

In order to effectively perform a function of the terminal 10 as discussed above, the control unit 11 includes the application executing module 11*a* and the reliable relationship acquiring module 11*b*. Particularly, the application executing module 11*a* performs a function associated with the execution of various types of applications. At this time, the application executing module 11*a* performs all functions associated with the execution of the representative application or the service application, based on the integrated ID.

Additionally, the reliable relationship acquiring module 11*b* performs a function for acquiring a reliable relationship between a plurality of applications (e.g., the representative application and the service application). Namely, using the reliability token received from the integrated authentication apparatus 20, the reliable relationship acquiring module 11*b* establishes a reliable relationship between applications.

Figure 3:
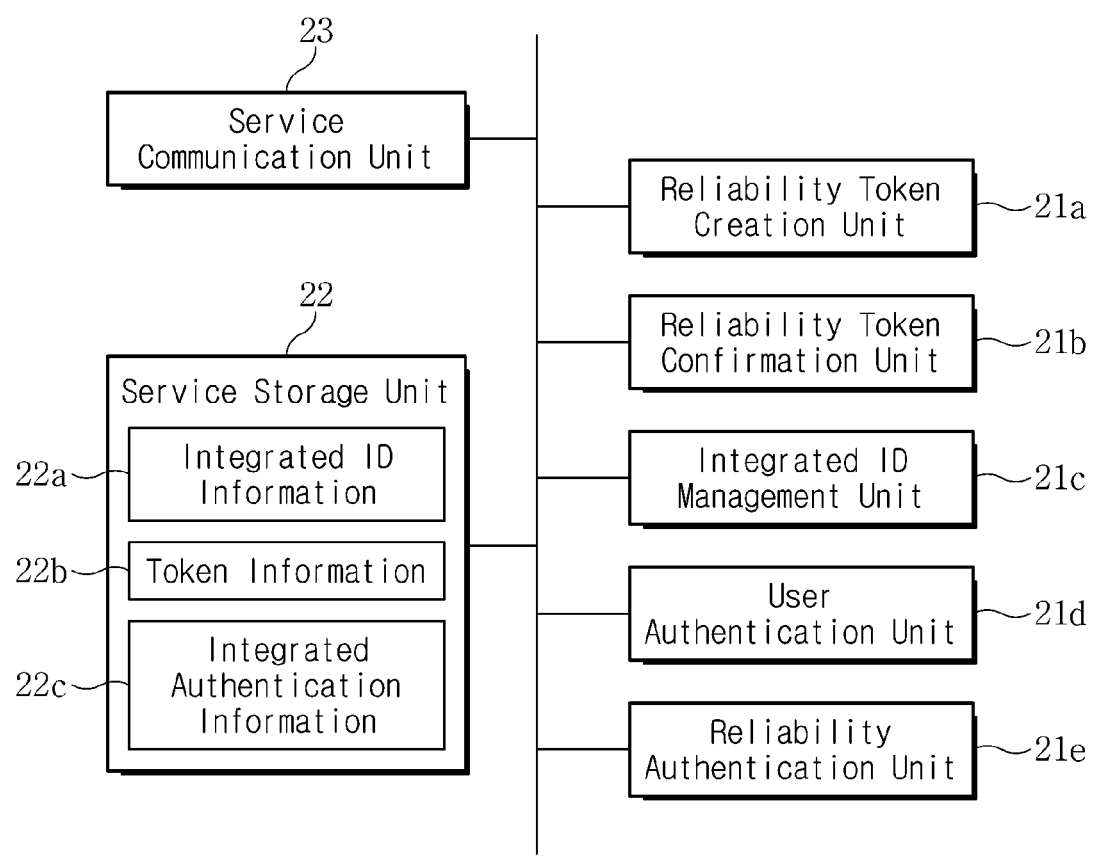
FIG. 3 is a block diagram illustrating the configuration of an integrated authentication apparatus in accordance with the present invention.

FIG. 3 is a block diagram illustrating the configuration of an integrated authentication apparatus in accordance with the present invention.

Referring to FIG. 3, the integrated authentication apparatus 20 according to this invention is configured to include a reliability token creation unit 21a, a reliability token confirmation unit 21b, an integrated ID management unit 21c, a user authentication unit 21d, a reliability authentication unit 21e, a service storage unit 22, and a service communication unit 23. The service storage unit 22 includes integrated ID information 22a, token information 22b, and integrated authentication information 22c. Particularly, the reliability token creation unit 21a, the reliability token confirmation unit 21b, the integrated ID management unit 21c, the user authentication unit 21d, and the reliability authentication unit 21e may be formed individually as separate modules and thereby perform a function of the integrated authentication apparatus 20 to acquire a reliable relationship between applications.

The service communication unit 23 is connected with the terminal 10 and the service providing apparatus 30 and then transmits or receives all data for acquiring a reliable relationship between applications. Also, the service communication unit 23 applies an integrated ID for applications to communications with the terminal 10 and the service providing apparatus 30 and transmits or receives data associated with integrated authentication using the representative application.

The service storage unit 22 stores therein programs and data for performing a function of the integrated authentication apparatus 20. Particularly, the service storage unit 22 stores a program for creating a reliability token to acquire a reliable relationship between applications, a program for confirming the reliability token, a program for managing the integrated ID, a program for creating an authentication token for application authentication using the integrated ID, and the like. Also, the service storage unit 22 stores integrated ID information 22a for use of an integrated ID by the acquisition of the reliable relationship between applications, and token information 22b having the reliability token to be used after the acquisition of the reliable relationship. Further, the service storage unit 22 stores integrated authentication information 22c for use of the integrated ID based on the reliable relationship between application, and the token information 22b having the authentication token and the reliability token to be applied to application authentication using the integrated ID.

The reliability token creation unit 21a receives a signal of requesting the confirmation of reliability between the representative application and the service application from the terminal 10. Additionally, the reliability token creation unit 21a creates the reliability token for acquiring the reliable relationship between the representative application and the service application. At this time, the reliability token creation unit 21a creates a single-use token for acquiring the reliable relationship between the representative application and the service application. Then the reliability token creation unit 21a transmits the created reliability token to the terminal 10.

The reliability token confirmation unit 21b determines whether a signal of requesting the confirmation of the reliability token is received from the service providing apparatus 30. If there is such a request, the reliability token confirmation unit 21b confirms the received reliability token. At this time, the reliability token confirmation unit 21b discards the reliability token after confirming the reliability token received from the service providing apparatus 30. Then the reliability token confirmation unit 21b transmits a confirmation result of the reliability token to the service providing apparatus 30.

Additionally, the integrated ID management unit 21c performs a function for integrating and managing IDs of applications. For this, the integrated ID management unit 21c may use the SSO authentication scheme. Therefore, this invention can be similarly applied to SSO in a mobile environment.

The user authentication unit 21d creates a token for user authentication in response to a login request including service identification information from the representative application installed in the terminal 10, or performs user authentication by confirming the received token for user authentication. At this time, the user authentication unit 21d stores an integrated ID of each user and an authentication token created for each user.

Particularly, in case the representative application is logged in, the user authentication unit 21d receives an authentication token received earlier by the representative application, together with service identification information, from the terminal 10. Meanwhile, if the representative application is not logged in, the user authentication unit 21d receives a user ID and password for login of the representative application, together with service identification information of the service application, from the terminal 10.

The user authentication unit 21d creates a token for authentication of the representative application. At this time, the user authentication unit 21d creates an authentication token which is recreated only at the time of login of the terminal 10 and stores a login result value.

The user authentication unit 21d uses an integrated ID in response to a request of the terminal 10, checks a login result based on a token created in response to a signal of requesting the confirmation of a login state of the representative application so as to login the service application, and transmits the checked result to the terminal 10.

The user authentication unit 21d performs a function for integrating and managing IDs of applications. For this, the user authentication unit 21d may use the SSO authentication scheme. Therefore, this invention can be similarly applied to SSO in a mobile environment.

The reliability authentication unit 21e creates a token for confirming the reliability of the service application corresponding to service identification information, based on information authenticated through the user authentication unit 21d, and offers the token to the terminal 10.

If a token confirmation is requested from the service providing apparatus 30 that offers a service corresponding to service identification information, the reliability authentication unit 21e verifies the token offered from the service providing apparatus 30 and then offers a verification result of the token to the service providing apparatus 30.

The reliability authentication unit 21e receives a signal of requesting the confirmation of reliability between the representative application and the service application in response to a request of the terminal 10. Also, the reliability authentication unit 21e creates a reliability token for confirming a reliable relationship between the representative application and the service application. At this time, the reliability authentication unit 21e creates a single-use token for the confirmation of the reliable relationship between the representative application and the service application. Thereafter, the reliability authentication unit 21e transmits the created reliability token to the terminal 10.

The reliability authentication unit 21e determines whether a signal of requesting the confirmation of the reliability token is received from the service providing apparatus 30. If this confirmation is requested, the reliability authentication unit 21e confirms the received reliability token. At this time, the reliability authentication unit 21e discards the confirmed reliability token after the confirmation of the reliability token received from the service providing apparatus 30. Then the reliability authentication unit 21e transmits a confirmation result of the reliability token to the service providing apparatus 30.

Meanwhile, the authentication apparatus 30 configured as discussed above may be implemented as at least one server that operates in a server computing scheme or a cloud computing scheme. Particularly, data for authentication using a security token may be offered through a cloud computing function of a cloud computing apparatus on the internet. Here, cloud computing refers to technique to offer, based on the on-demand technology, internet-based virtualized resources, e.g., hardware (server, storage, network, etc.), software (database, security, web server, etc.), service, data, and the like, to digital terminals such as a desktop computer, a tablet computer, a notebook, a netbook, a smart phone, and the like.

Figure 4:
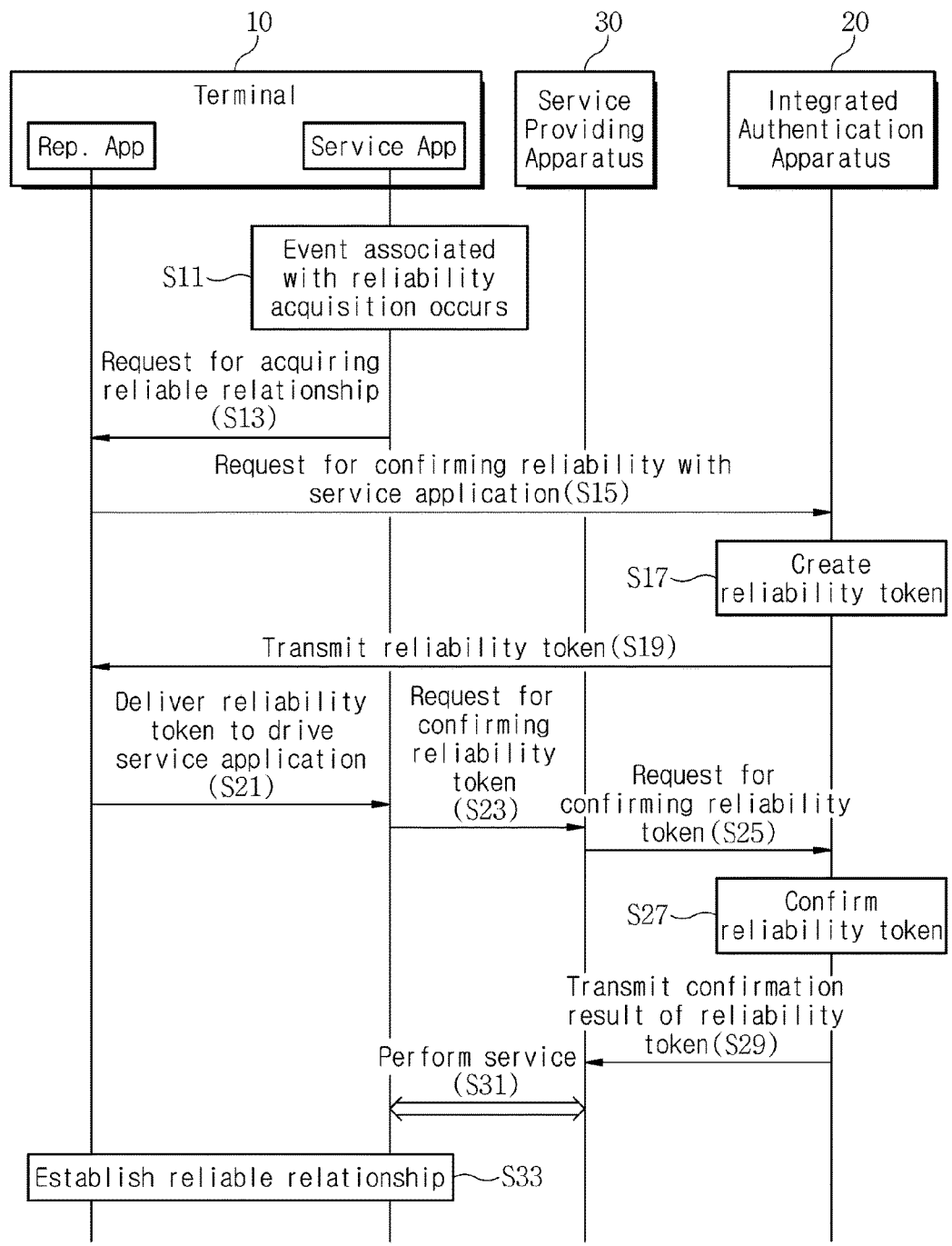
FIG. 4 is a data flow diagram illustrating a process of acquiring a reliable relationship between applications in accordance with the present invention.

FIG. 4 is a data flow diagram illustrating a process of acquiring a reliable relationship between applications in accordance with the present invention. In particular, the following description will be based on the assumption that a reliable relationship has been already established between the representative application and the integrated authentication apparatus 20.

Referring to FIG. 4, in order to acquire a reliable relationship between applications, the terminal 10 detects an event for requesting the acquisition of a reliable relationship between the representative application and the service application. Namely, at step S11, the terminal 10 detects the occurrence of an event associated with the acquisition of reliability with the representative application from the service application. In response to the occurrence of an event, the terminal 10 requests at step S13 the representative application to acquire a reliable relationship with the service application.

At step S15, the terminal 10 requests the integrated authentication apparatus 20 to confirm the reliability between the representative application and the service application. At step S17, in response to this request for the confirmation of reliability, the integrated authentication apparatus 20 creates a reliability token for acquiring a reliable relationship between the representative application and the service application. At this time, the integrated authentication apparatus 20 creates a single-use token for acquiring a reliable relationship between the representative application and the service application. Then, at step S19, the integrated authentication apparatus 20 transmits the created reliability token to the terminal 10.

At step S21, the terminal 10 delivers the reliability token, received from the integrated authentication apparatus 20, to the service application through the representative application so as to drive the service application. Namely, the terminal 10 delivers the reliability token, received in response to the reliability confirmation request of step S15, to the service application. Additionally, at step S23, the terminal 10 requests the service providing apparatus 30 to confirm the reliability token for driving the service application through the service application.

At step S25, the service providing apparatus 30 requests the integrated authentication apparatus 20 to confirm the reliability token. Then, at step S27, the integrated authentication apparatus 20 confirms the reliability token in response to the request received from the service providing apparatus 30. At this time, the integrated authentication apparatus 20 confirms the reliability token received from the service providing apparatus 30, and then discards the reliability token. Then, at step S29, the integrated authentication apparatus 20 transmits a confirmation result of the reliability token to the service providing apparatus 30.

At step S31, the service providing apparatus 30 drives the service application of the terminal 10 and performs a corresponding service. Namely, depending on the confirmation result of the reliability token, the terminal 10 drives the service application offered through the service providing apparatus 30.

Therefore, at step S33, the terminal 10 establishes a reliable relationship between the representative application and the service application.

Figure 5:
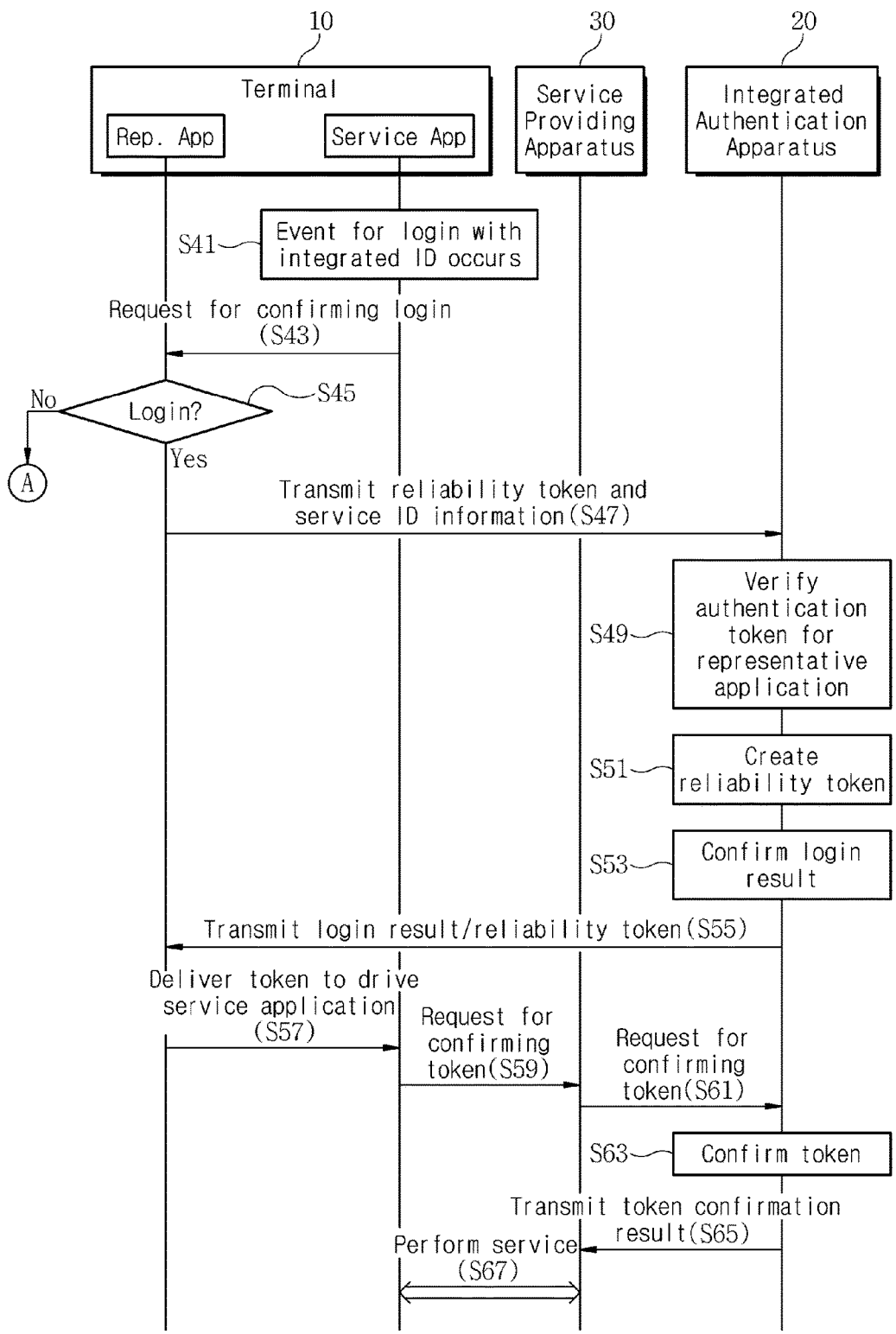
FIG. 5 is a data flow diagram illustrating an integrated authentication process using a representative application in accordance with the present invention.

FIG. 5 is a data flow diagram illustrating an integrated authentication process using a representative application in accordance with the present invention. In particular, the following description will be based on the assumption that a reliable relationship has been already established between a representative application and the integrated authentication apparatus 20.

Referring to FIG. 5, for an application authentication using an integrated ID, the terminal 10 detects the occurrence of an event for logging in with the integrated ID, and requests the representative application to confirm login (steps S41 and S43). Namely, the terminal 10 uses the integrated ID and detects an event for logging in the service application depending on a login state of the representative application.

At step S45, in response to this event, the terminal 10 checks whether the representative application is logged in. If the representative application is logged in, the terminal 10 transmits, at step S47, an authentication token and service identification information to the integrated authentication apparatus 20 so as to request the confirmation of a login state of the representative application.

At step S49, in response to a login request including service identification information from the representative application installed in the terminal 10, the integrated authentication apparatus 20 performs user authentication through a process of verifying the authentication token. Then, at step S51, the integrated authentication apparatus 20 creates a reliability token for confirming a reliable relationship between the representative application and the service application. At this time, the integrated authentication apparatus 20 creates a single-use token for confirming a reliable relationship between the representative application and the service application.

At step S53, the integrated authentication apparatus 20 confirms a login result based on the created token. Then, at step S55, the integrated authentication apparatus 20 transmits the confirmed login result and the reliability token to the terminal 10.

Once the login result of the representative application and the reliability token are received, the terminal 10 delivers at step S57 the reliability token to the service application so as to drive the service application. Namely, when the login result is received from the integrated authentication apparatus 20, the terminal 10 requests at step S59 the service providing apparatus 30 to confirm the reliability token for driving the service application.

At step S61, the service providing apparatus 30 requests the integrated authentication apparatus 20 to confirm the reliability token. Then, at step S63, the integrated authentication apparatus 20 confirms the reliability token in response to the request received from the service providing apparatus 30. At this time, the integrated authentication apparatus 20 confirms the reliability token received from the service providing apparatus 30, and then discards the reliability token. Then, at step S65, the integrated authentication apparatus 20 transmits a confirmation result of the reliability token to the service providing apparatus 30.

At step S67, the service providing apparatus 30 drives the service application of the terminal 10 and performs a corresponding service. Namely, depending on the confirmation result of the reliability token, the terminal 10 drives the service application offered through the service providing apparatus 30.

Figure 6:
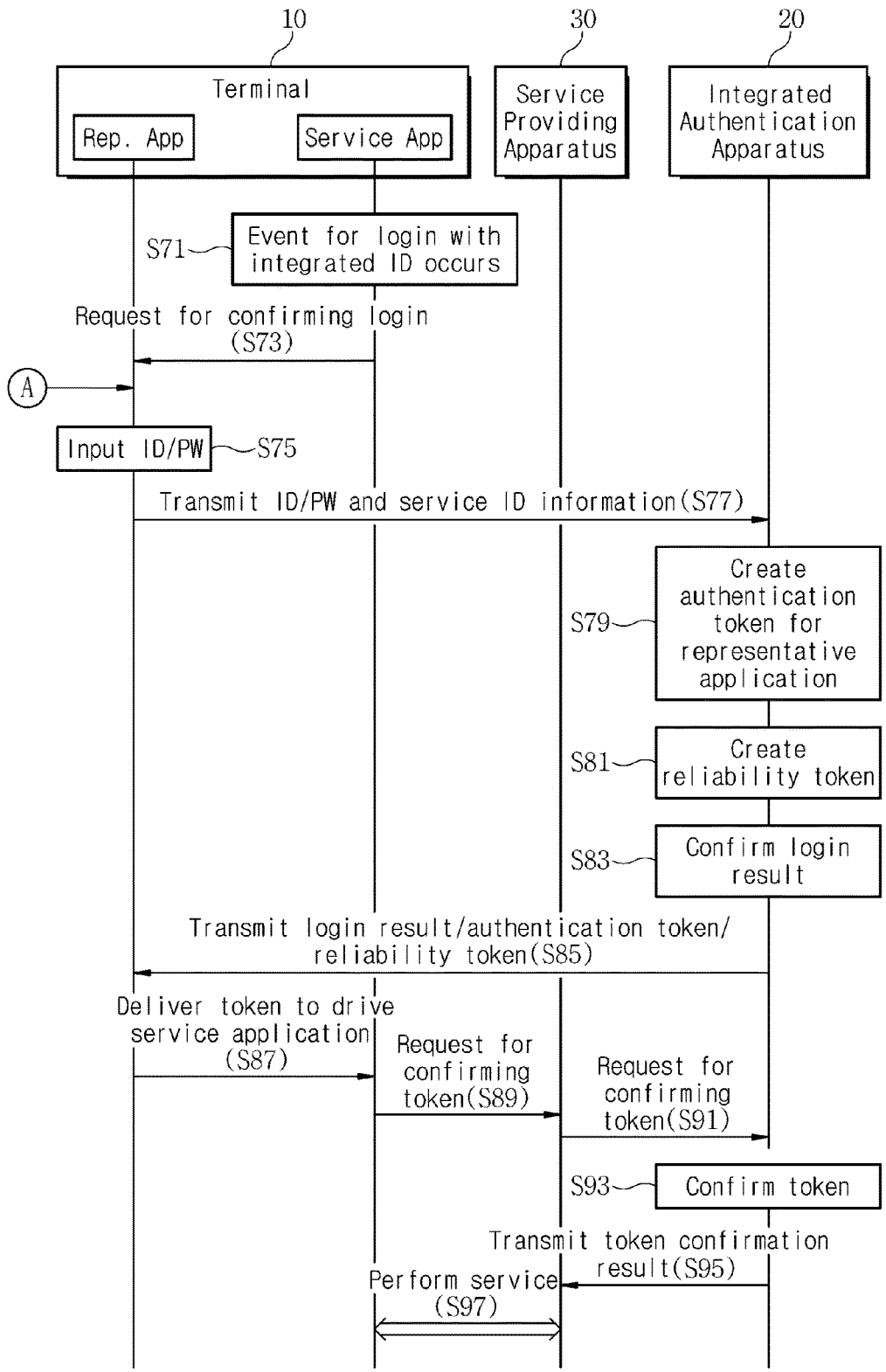
FIG. 6 is a data flow diagram illustrating an integrated authentication process using a representative application in accordance with another embodiment of the present invention.

FIG. 6 is a data flow diagram illustrating an integrated authentication process using a representative application in accordance with another embodiment of the present invention.

Referring to FIG. 6, for an application authentication using an integrated ID, the terminal 10 detects the occurrence of an event for logging in with the integrated ID, and requests the representative application to confirm login (steps S71 and S73). Namely, the terminal 10 uses the integrated ID and detects an event for logging in the service application depending on a login state of the representative application. Then, in response to this event, the terminal 10 checks whether the representative application is logged in.

If the representative application is not logged in, the terminal 10 receives at step S75 a user ID and a password inputted for login of the representative application. Then, at step S77, the terminal 10 transmits the received user ID, the received password, and service identification information to the integrated authentication apparatus 20 so as to request the confirmation of a login state of the representative application.

At step S49, in response to a login request including service identification information from the representative application installed in the terminal 10, the integrated authentication apparatus 20 creates an authentication token. Namely, by using such a user ID and password, the integrated authentication apparatus 20 creates the authentication token applicable to an integrated ID. Additionally, the terminal 10 stores such an integrated ID for each user and an authentication token created for each user.

At step S81, the integrated authentication apparatus 20 creates a reliability token for confirming a reliable relationship between the representative application and the service application. At this time, the integrated authentication apparatus 20 creates a single-use token for confirming a reliable relationship between the representative application and the service application. Additionally, at step S83, the integrated authentication apparatus 20 confirms a login result based on the created token. Then, at step S85, the integrated authentication apparatus 20 transmits the confirmed login result, the authentication token, and the reliability token to the terminal 10.

Once the login result of the representative application, the authentication token, and the reliability token are received, the terminal 10 delivers at step S87 the reliability token to the service application so as to drive the service application. Namely, when the login result is received from the integrated authentication apparatus 20, the terminal 10 requests at step S89 the service providing apparatus 30 to confirm the reliability token for driving the service application.

At step S91, the service providing apparatus 30 requests the integrated authentication apparatus 20 to confirm the reliability token. Then, at step S93, the integrated authentication apparatus 20 confirms the reliability token in response to the request received from the service providing apparatus 30. At this time, the integrated authentication apparatus 20 confirms the reliability token received from the service providing apparatus 30, and then discards the reliability token. Then, at step S95, the integrated authentication apparatus 20 transmits a confirmation result of the reliability token to the service providing apparatus 30.

At step S97, the service providing apparatus 30 drives the service application of the terminal 10 and performs a corresponding service. Namely, depending on the confirmation result of the reliability token, the terminal 10 drives the service application offered through the service providing apparatus 30.

Figure 7:
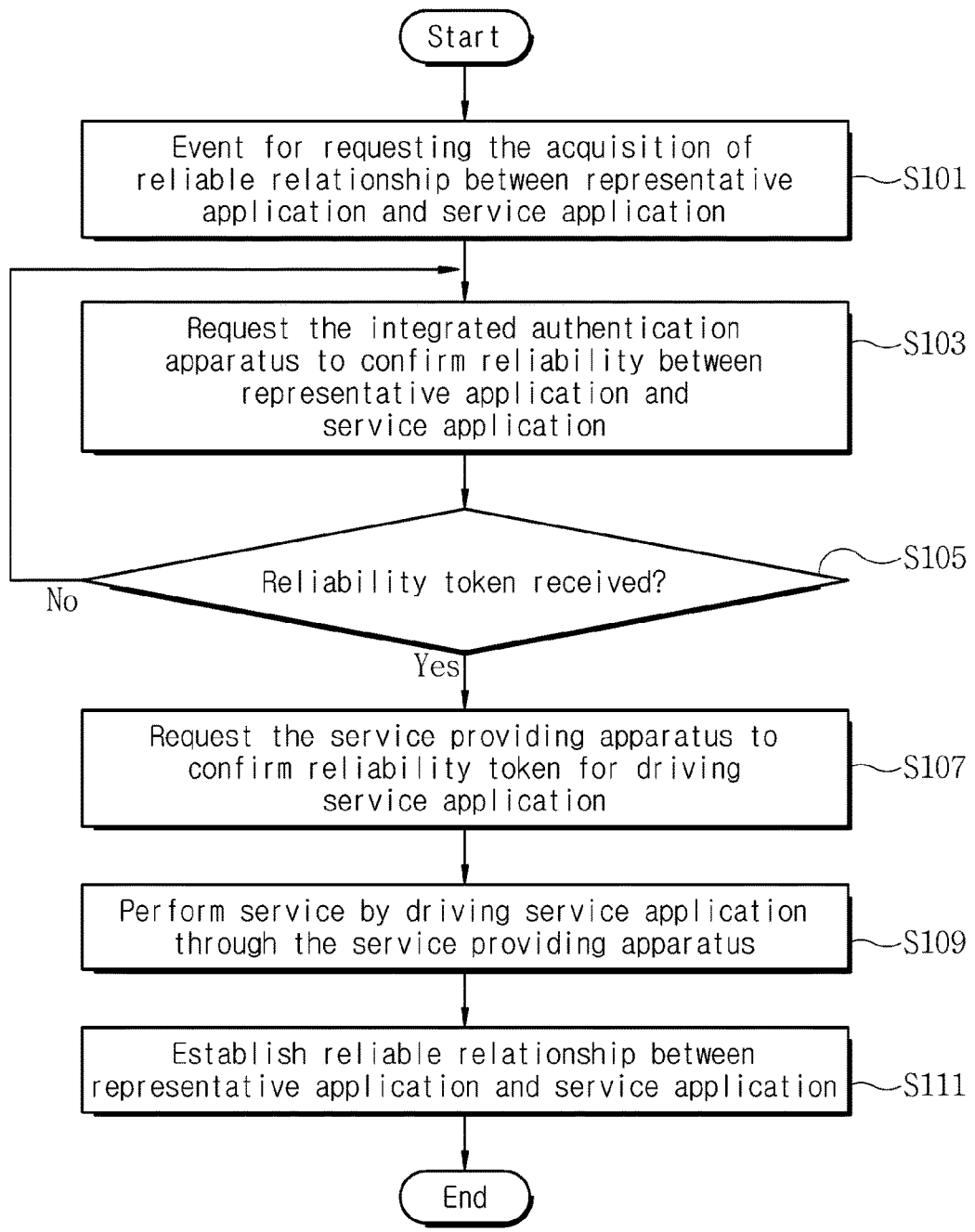
FIG. 7 is a flow diagram illustrating an operating method of a terminal in accordance with an embodiment of the present invention.

FIG. 7 is a flow diagram illustrating an operating method of a terminal in accordance with an embodiment of the present invention. In particular, the following description regarding the operation of the terminal 10 will be based on the assumption that a reliable relationship has been already established between the representative application and the integrated authentication apparatus 20.

Referring to FIG. 7, at step S101, the terminal 10 detects an event for requesting the acquisition of a reliable relationship between the representative application and the service application. Here, the terminal 10 detects the occurrence of an event associated with the acquisition of reliability with the representative application from the service application, and requests the representative application to acquire a reliable relationship with the service application in response to the occurrence of an event.

At step S103, the terminal 10 requests the integrated authentication apparatus 20 to confirm the reliability between the representative application and the service application. Additionally, at step S105, the terminal 10 determines whether a reliability token is received. If the reliability token is received, the terminal 10 requests at step S107 the service providing apparatus 30 to confirm the reliability token. Thereafter, depending on a confirmation result of the reliability token, the terminal 10 drives at step S109 the service application offered through the service providing apparatus 30.

At step S111, the terminal 10 establishes a reliable relationship between the representative application and the service application.

Figure 8:
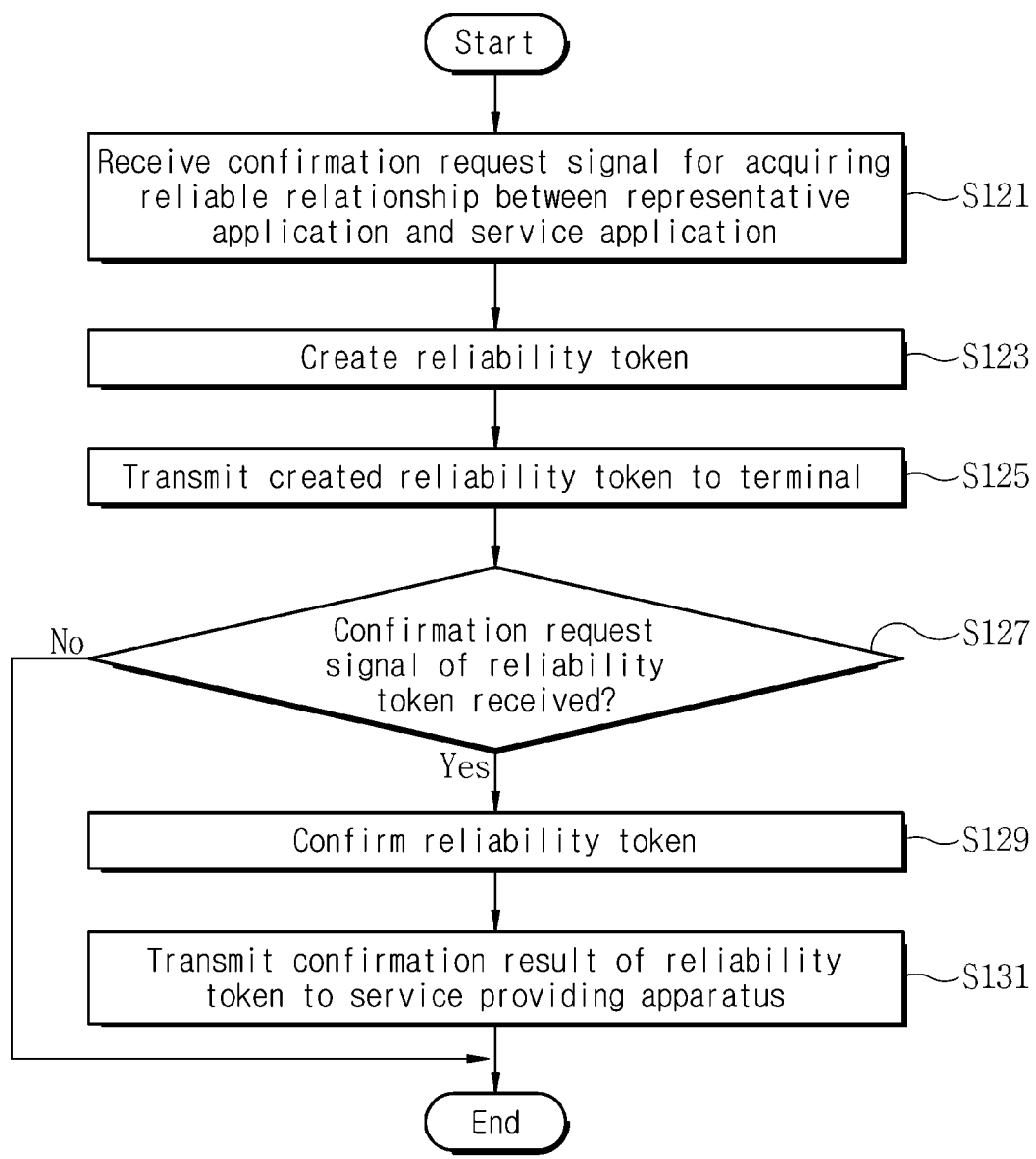
FIG. 8 is a flow diagram illustrating an operating method of an integrated authentication apparatus in accordance with an embodiment of the present invention.

FIG. 8 is a flow diagram illustrating an operating method of an integrated authentication apparatus in accordance with an embodiment of the present invention. In particular, the following description regarding the operation of the integrated authentication apparatus 20 will be based on the assumption that a reliable relationship has been already established between the representative application and the integrated authentication apparatus 20.

Referring to FIG. 8, at step S121, the integrated authentication apparatus 20 receives a request for confirming the reliability between the representative application and the service application from the terminal 10.

At step S123, the integrated authentication apparatus 20 creates a reliability token for acquiring a reliable relationship between the representative application and the service application. At this time, the integrated authentication apparatus 20 creates a single-use token for acquiring a reliable relationship between the representative application and the service application.

At step S125, the integrated authentication apparatus 20 transmits the created reliability token to the terminal 10. Additionally, at step S127, the integrated authentication apparatus 20 determines whether a signal of requesting the confirmation of the reliability token is received from the service providing apparatus 30. If the confirmation of the reliability token is requested, the integrated authentication apparatus 20 confirms the received reliability token at step S129. At this time, the integrated authentication apparatus 20 confirms the reliability token received from the service providing apparatus 30, and then discards the reliability token. Then, at step S131, the integrated authentication apparatus 20 transmits a confirmation result of the reliability token to the service providing apparatus 30.

According to this invention, when a reliable relationship is established between the representative application and the service application, namely in case the representative application and the service application are logged in through an integrated ID, it is possible to directly use a service without inconvenience of having to log in again.

Figure 9:
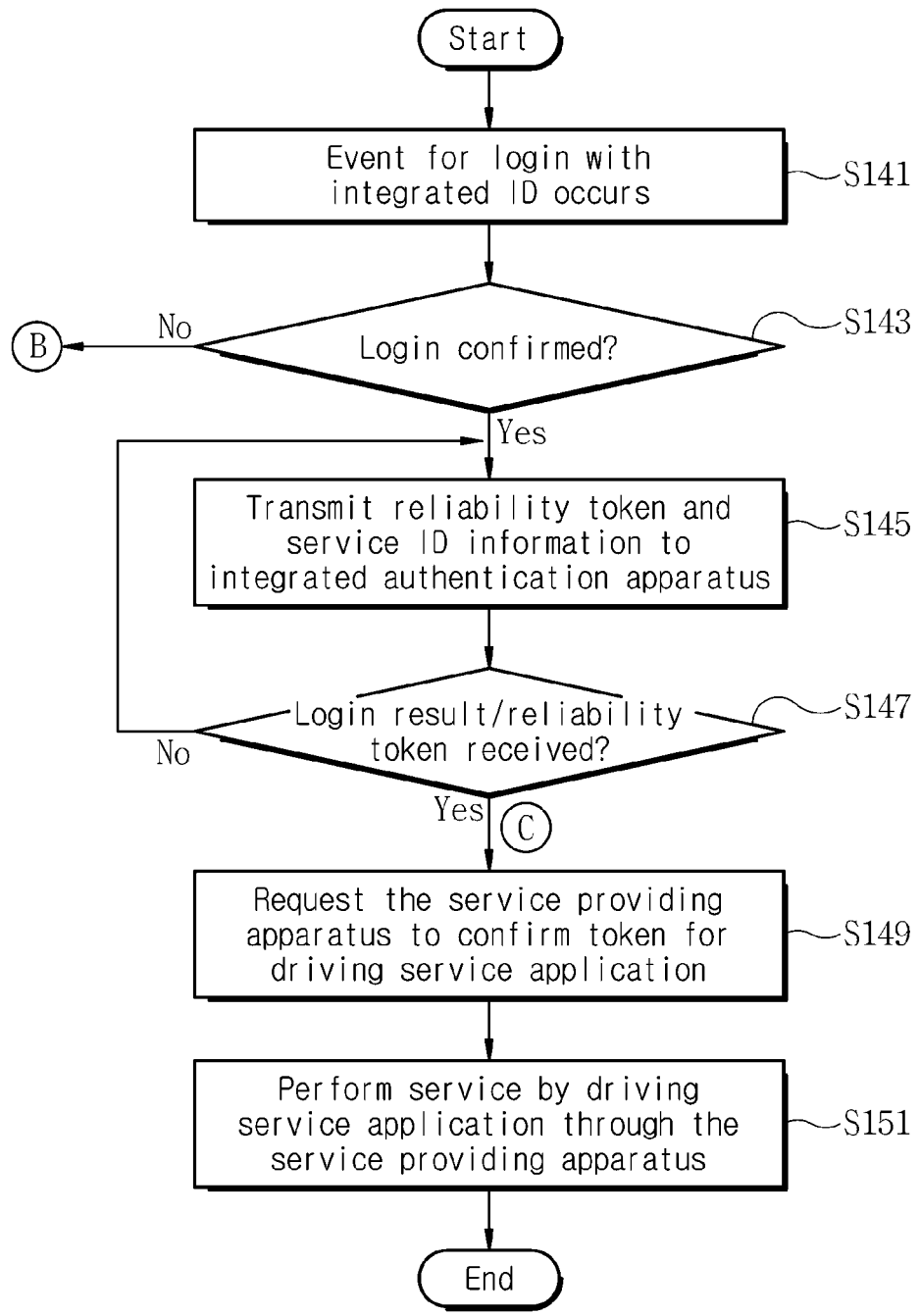
FIG. 9 is a flow diagram illustrating an operating method of a terminal in accordance with another embodiment of the present invention.

FIG. 9 is a flow diagram illustrating an operating method of a terminal in accordance with another embodiment of the present invention. In particular, the following description regarding the operation of the terminal 10 will be based on the assumption that a reliable relationship has been already established between the representative application and the integrated authentication apparatus 20.

Referring to FIG. 9, at step S141, the terminal 10 detects the occurrence of an event for logging in with the integrated ID. Then, at step S143, the terminal 10 determines whether the representative application is logged in. Namely, the terminal 10 uses the integrated ID and detects an event for logging in the service application depending on a login state of the representative application.

If the representative application is logged in, the terminal 10 transmits, at step S145, an authentication token and service identification information to the integrated authentication apparatus 20 so as to request the confirmation of a login state of the representative application.

Additionally, at step S147, the terminal 10 determines whether a reliability token and a login result of the representative application are received from the integrated authentication apparatus 20.

If the login result of the representative application and the reliability token are received, the terminal 10 requests at step S149 the service providing apparatus 30 to confirm the reliability token for driving the service application. Thereafter, at step S151, depending on the confirmation result of the reliability token, the terminal 10 drives the service application and performs a corresponding service. Therefore, in a mobile environment, the terminal 10 can establish a reliable relationship with the service application through the representative application, and also apply an integrated authentication scheme for the authentication of the service application.

Figure 10:
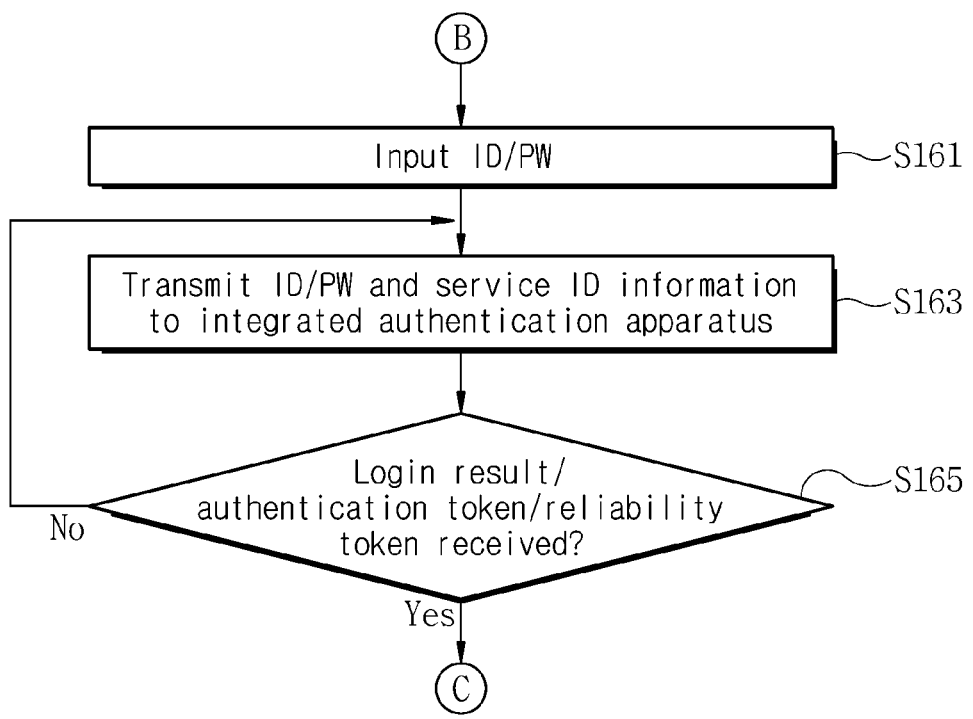
FIG. 10 is a flow diagram illustrating an operating method of a terminal in accordance with still another embodiment of the present invention.

FIG. 10 is a flow diagram illustrating an operating method of a terminal in accordance with still another embodiment of the present invention.

Referring to FIG. 10, if the representative application is not logged in during the integrated authentication process using the representative application, the terminal 10 receives at step S161 a user ID and password inputted for login of the representative application. Then, at step S163, the terminal 10 transmits the received user ID, the received password, and service identification information to the integrated authentication apparatus 20 so as to request the confirmation of a login state of the representative application.

Thereafter, at step S165, the terminal 10 determines whether a login result of the representative application, an authentication token and a reliability token are received from the integrated authentication apparatus 20.

If the login result of the representative application, the authentication token, and the reliability token are received, the terminal 10 requests the service providing apparatus 30 to confirm the reliability token for driving the service application. Additionally, depending on the confirmation result of the reliability token, the terminal 10 drives the service application and performs a corresponding service. Therefore, in a mobile environment, the terminal 10 can establish a reliable relationship with the service application through the representative application, and also apply an integrated authentication scheme for the authentication of the service application.

Figure 11:
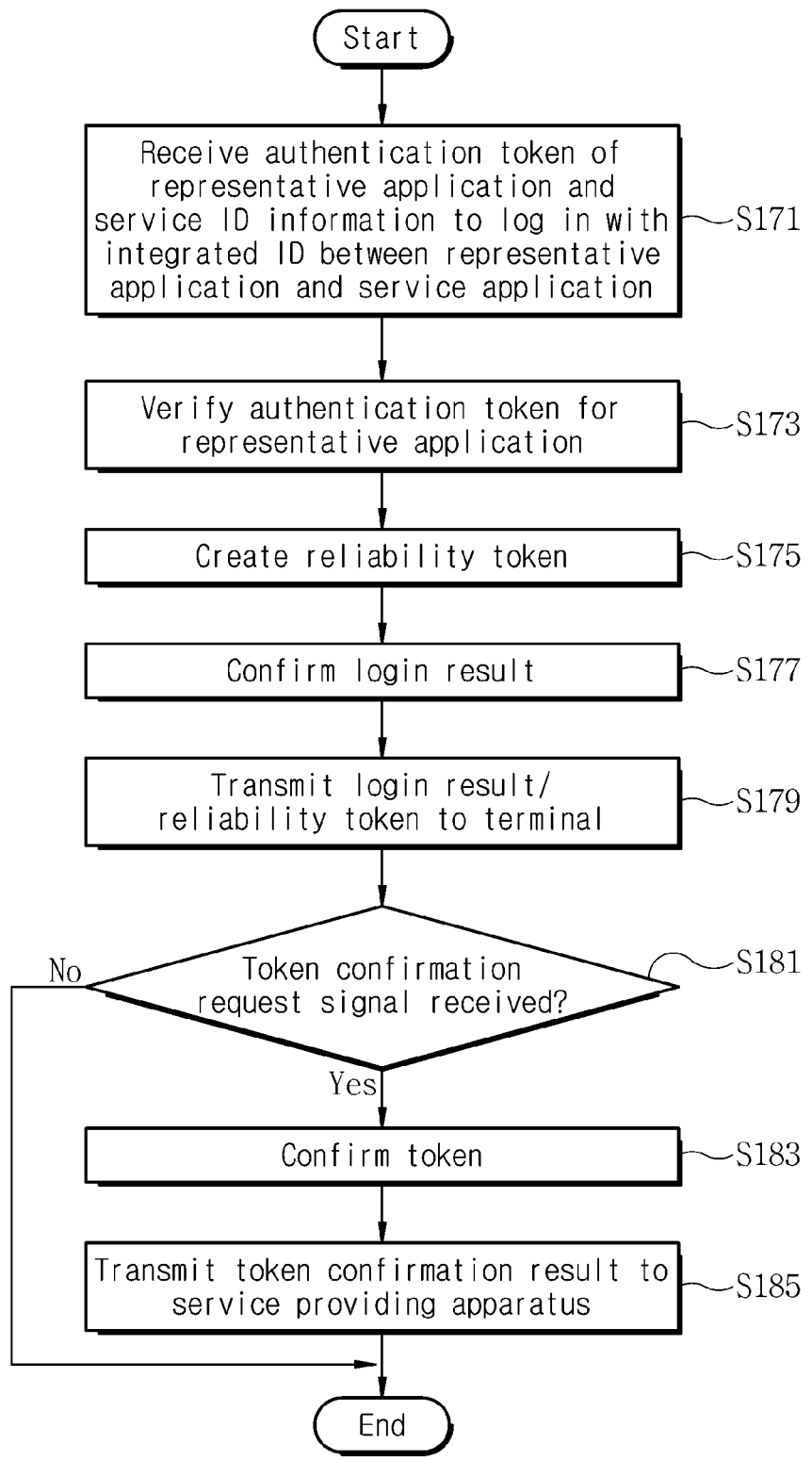
FIG. 11 is a flow diagram illustrating an operating method of an integrated authentication apparatus in accordance with another embodiment of the present invention.

FIG. 11 is a flow diagram illustrating an operating method of an integrated authentication apparatus in accordance with another embodiment of the present invention. In particular, the following description regarding the operation of the integrated authentication apparatus 20 will be based on the assumption that a reliable relationship has been already established between the representative application and the integrated authentication apparatus 20.

Referring to FIG. 11, at step S171, the integrated authentication apparatus 20 uses an integrated ID at the request of the terminal 10, and also receives an authentication token for the login of the representative application and service identification information so as to log in the service application. Herein, the representative application is assumed to be logged in.

At step S173, the integrated authentication apparatus 20 verifies the authentication token for the authentication of the representative application. Thereby the integrated authentication apparatus 20 performs user authentication. Here, the authentication token is created again only at the time of login of the terminal 10 and also created for each user and each integrated ID of each user. Additionally, at step S175, the integrated authentication apparatus 20 creates a reliability token for confirming a reliable relationship between the representative application and the service application. Here, the reliability token is a single-use token for confirming a reliable relationship between the representative application and the service application.

At step S177, the integrated authentication apparatus 20 confirms a login result based on the created token. Then, at step S179, the integrated authentication apparatus 20 transmits the confirmed login result and the reliability token to the terminal 10.

At step S181, the integrated authentication apparatus 20 determines whether a signal of requesting the confirmation of the reliability token is received from the service providing apparatus 30. If so, the integrated authentication apparatus 20 confirms at step S183 the reliability token in response to the reliability token confirmation request. At this time, the integrated authentication apparatus 20 confirms the reliability token received from the service providing apparatus 30, and then discards the reliability token. Then, at step S185, the integrated authentication apparatus 20 transmits a confirmation result of the reliability token to the service providing apparatus 30.

Figure 12:
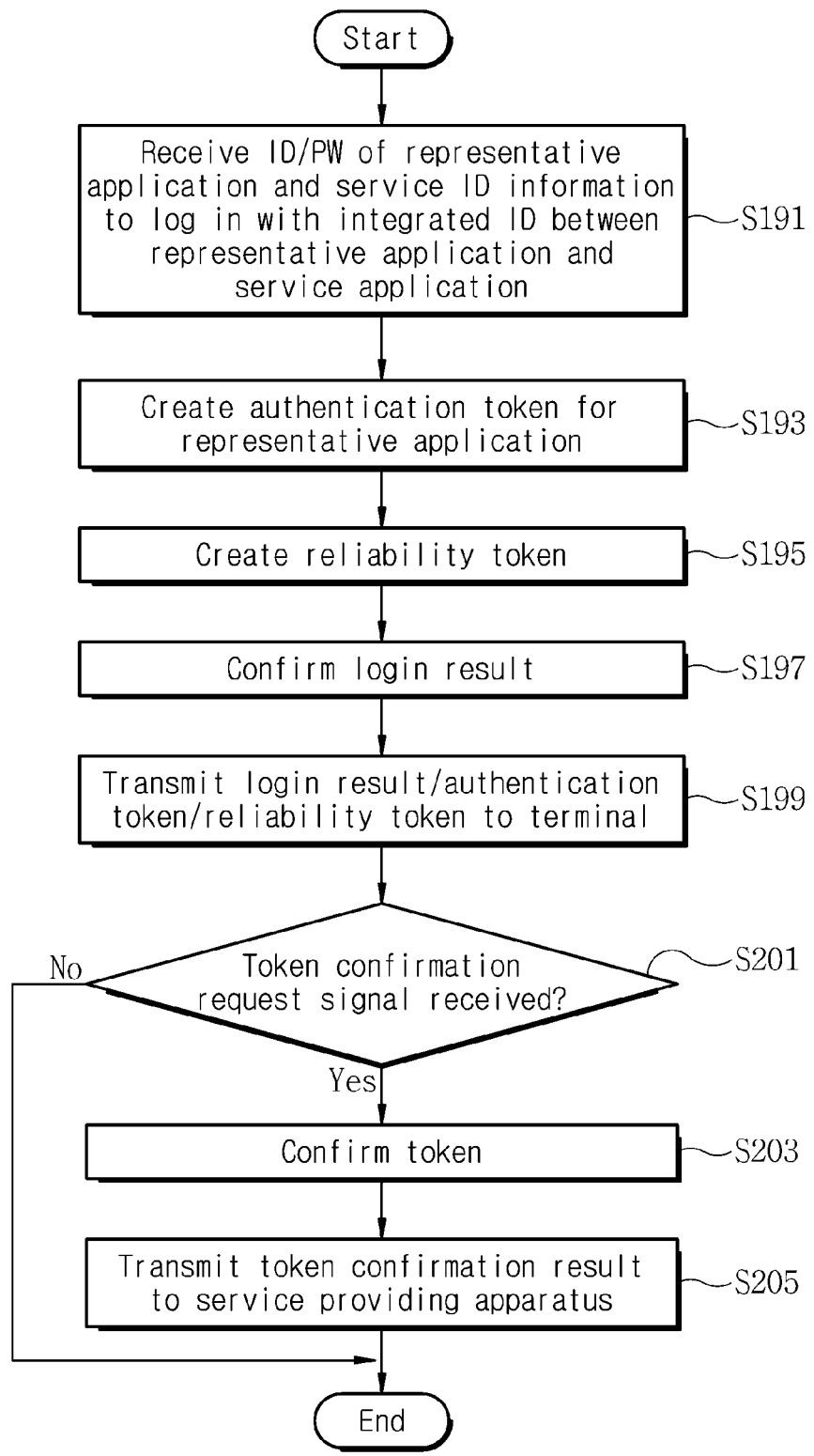
FIG. 12 is a flow diagram illustrating an operating method of an integrated authentication apparatus in accordance with still another embodiment of the present invention.

FIG. 12 is a flow diagram illustrating an operating method of an integrated authentication apparatus in accordance with still another embodiment of the present invention.

Referring to FIG. 12, at step S191, the integrated authentication apparatus 20 uses an integrated ID at the request of the terminal 10, and also receives a user ID and password of the representative application and service identification information so as to log in the service application. Herein, the representative application is assumed to be not logged in.

At step S193, the integrated authentication apparatus 20 creates an authentication token for the authentication of the representative application. Thereby the integrated authentication apparatus 20 performs user authentication. Here, the authentication token is created again only at the time of login of the terminal 10 and also created for each user and each integrated ID of each user. Additionally, at step S195, the integrated authentication apparatus 20 creates a reliability token for confirming a reliable relationship between the representative application and the service application. Here, the reliability token is a single-use token for confirming a reliable relationship between the representative application and the service application.

At step S197, the integrated authentication apparatus 20 confirms a login result based on the created token. Then, at step S199, the integrated authentication apparatus 20 transmits the confirmed login result, the authentication token, and the reliability token to the terminal 10.

At step S201, the integrated authentication apparatus 20 determines whether a signal of requesting the confirmation of the reliability token is received from the service providing apparatus 30. If so, the integrated authentication apparatus 20 confirms at step S203 the reliability token in response to the reliability token confirmation request. At this time, the integrated authentication apparatus 20 confirms the reliability token received from the service providing apparatus 30, and then discards the reliability token. Then, at step S205, the integrated authentication apparatus 20 transmits a confirmation result of the reliability token to the service providing apparatus 30.

Meanwhile, the memory installed in the terminal 10 or in the integrated authentication apparatus 20 stores information therein. In an embodiment, the memory is a computer-readable medium. The memory may be a volatile memory unit in an embodiment or a nonvolatile memory unit in another embodiment. In an embodiment, the storage is a computer-readable medium. In various embodiments, the storage may include, for example, a hard disk device, an optical disk device, or any other mass storage device.

Although an exemplary configuration of the apparatus is disclosed in the description and drawings, the above-discussed embodiments of functional operations and subject matters may be implemented in any other type of digital electronic circuitry, or in any computer software, firmware or hardware including the structures disclosed herein and their structural equivalents, or in any combination thereof. Embodiments of the above-discussed subject matter may be implemented as one or more computer program products, i.e., one or more modules of computer program instructions encoded on a program storage medium for execution by, or to control the operation of, the apparatus according to this invention. A computer-readable medium may be a machine-readable storage device, a machine-readable storage substrate, a memory device, a machine-readable composition of material affecting a radio wave type signal, or any combination thereof.

Computer-readable recording media suitable for storing computer program instructions and data include, for example, magnetic media such as a hard disk, a floppy disk and a magnetic tape, optical media such as CD-ROM (Compact Disk Read Only Memory) and DVD (Digital Video Disk), magneto-optical media such as floptical disk, and a semiconductor memory such as ROM (Read Only Memory), RAM (Random Access Memory), flash memory, EPROM (Erasable Programmable ROM), and EEPROM (Electrically Erasable Programmable ROM). A processor and memory may be supplemented with a special purpose logic circuit or integrated thereto. Program instructions may include machine language codes made by a compiler and high-level language codes executable in a computer using an interpreter or the like. These hardware devices may be configured to operate as one or more software modules to perform the operation of this invention, and vice versa.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. An integrated authentication apparatus comprising:
   a service communication unit connected with at least one terminal and a service providing apparatus, and configured to transmit or receive data for acquiring a reliable relationship between a plurality of applications;
   a reliability token creation unit configured to
      receive a signal of requesting confirmation of reliability between a representative application and a service application from the representative application executed in a terminal of the at least one terminal, the terminal that stores the representative application and the service application,
      in response to a login request including service identification information from the representative application executed in the terminal, create a reliability token for acquiring the reliable relationship between the representative application and the service application, and transmit the created reliability token to the terminal;

a reliability token confirmation unit configured to confirm the created reliability token when a signal of requesting confirmation of the created reliability token is received from the service providing apparatus that receives a request for the confirmation of the reliability token from the service application of the terminal, and transmit a confirmation result of the created reliability token to the service providing apparatus; and an integrated ID management unit configured to integrate and manage IDs of the plurality of applications.

2. The integrated authentication apparatus of claim 1, further comprising:

a user authentication unit configured to create a token for user authentication in response to a login request including service identification information from a representative application installed in the terminal, perform user authentication by confirming the token for user authentication when the token is received, or store an integrated ID of each user and an authentication token created for the each user; and a reliability authentication unit configured to create a token for confirming reliability of a service application corresponding to the service identification information, based on information authenticated through the user authentication unit, offer the created token to the terminal, to verify the token offered from the service providing apparatus when a token confirmation is requested from the service providing apparatus for offering a service corresponding to the service identification information, and offer a verification result of the token to the service providing apparatus.

3. The integrated authentication apparatus of claim 1, wherein the reliability token creation unit is configured to create a single-use token for acquiring the reliable relationship between the representative application and the service application.

4. The integrated authentication apparatus of claim 1, wherein the reliability token confirmation unit is configured to confirm the reliability token received from the service providing apparatus and discard the confirmed reliability token.

5. The integrated authentication apparatus of claim 2, wherein the reliability authentication unit is configured to store the reliability token for confirming reliability of the service application, and delete the reliability token verified once.

6. A terminal comprising:

a communication unit configured to transmit or receive data for acquiring a reliable relationship between a plurality of applications by communicating with an integrated authentication apparatus and a service providing apparatus; and a memory unit configured to store a representative application and a service application;

a control unit configured to detect an event for requesting acquisition of a reliable relationship between the representative application and the service application, request the integrated authentication apparatus to confirm reliability between the representative application and the service application and to create a reliability token for acquiring the reliable relationship between the representative application and the service application, request the service providing apparatus to confirm the reliability token for executing the service application when the reliability token is received from the integrated authentication apparatus, execute the service application offered through the service providing apparatus depending on a confirmation result of the reliability token transmitted from the integrated authentication apparatus to the service providing apparatus, and establish a reliable relationship between the representative application and the service application.

7. The terminal of claim 6, wherein the representative application includes a representative application, and the service application includes at least one service application.

8. The terminal of claim 6, wherein the control unit is configured to execute the representative application in response to a login request from the service application, request authentication by transmitting user authentication information and service identification information corresponding to the service application to the integrated authentication apparatus through the representative application, receive an authentication token and a reliability token from the integrated authentication apparatus in response to the request, and transmit, at the service application, the reliability token to the service providing apparatus so that the service providing apparatus confirms authentication by using the reliability token.

9. The terminal of claim 8, wherein the representative application is one of a plurality of service applications.

10. The terminal of claim 8, wherein the control unit is configured to request verification of authentication by transmitting the received authentication token and the service identification information of the service application to the integrated authentication apparatus when the representative application is in a login state, and receive an authentication result and the reliability token from the integrated authentication apparatus.

11. An authentication method using an application, the authentication method performed by a terminal storing a representative application and a service application, the authentication method comprising:

detecting an event for requesting acquisition of a reliable relationship between the representative application and the service application;

in response to a login request including service identification information from the representative application, requesting an integrated authentication apparatus to confirm reliability between the representative application and the service application and to create a reliability token for acquiring the reliable relationship between the representative application and the service application;

requesting a service providing apparatus to confirm the reliability token for driving the service application when the reliability token is received from the integrated authentication apparatus;

driving the service application offered through the service providing apparatus depending on a confirmation result of the reliability token transmitted from the integrated authentication apparatus to the service providing apparatus; and establishing a reliable relationship between the representative application and the service application.

12. The authentication method of claim 11, wherein the reliability token is a single-use token which is issued for acquiring the reliable relationship between the representative application and the service application at the integrated authentication apparatus, and which is discarded after token confirmation performed at the integrated authentication apparatus in response to a request of the service providing apparatus.

13. The authentication method of claim 11, wherein the detecting of the event includes:

detecting occurrence of an event associated with acquisition of reliability with the representative application from the service application; and requesting the representative application to acquire a reliable relationship with the service application in response to the event occurrence.

14. The authentication method of claim 11, wherein the establishing of the reliable relationship includes establishing the reliable relationship with the service application in a mobile environment through the representative application which is a representative application, and applying at least one authentication technique for authentication of the service application.

* * * * *